US012757938B2

(12) United States Patent
Cross et al.

(10) Patent No.: US 12,757,938 B2
(45) Date of Patent: Oct. 13, 2026

(54) AEROSOL-GENERATING DEVICE HAVING MULTI-LAYER INSULATION

(71) Applicant: Philip Morris Products S.A., Neuchatel (CH)

(72) Inventors: David Cross, Letchworth (GB); Stuart Michael Ruan Jones, Royston (GB); John Antony Stephenson, Cambridge (GB); Irene Taurino, Leuven (BE); Gergely Melis, Royston (GB)

(73) Assignee: Philip Morris Products S.A., Neuchatel (CH)

( * ) Notice: Subject to any disclaimer, the term of this patent is extended or adjusted under 35 U.S.C. 154(b) by 373 days.

(21) Appl. No.: 18/255,208

(22) PCT Filed: Dec. 2, 2021

(86) PCT No.: PCT/EP2021/084048
§ 371 (c)(1),
(2) Date: May 31, 2023

(87) PCT Pub. No.: WO2022/117762
PCT Pub. Date: Jun. 9, 2022

(65) Prior Publication Data

US 2024/0000149 A1 Jan. 4, 2024

(30) Foreign Application Priority Data

Dec. 4, 2020 (EP) .................................... 20212009

(51) Int. Cl.
*A24F 47/00* (2020.01)
*A24F 40/20* (2020.01)
(Continued)

(52) U.S. Cl.
CPC .............. *A24F 40/46* (2020.01); *A24F 40/20* (2020.01); *B32B 5/18* (2013.01); *B32B 9/005* (2013.01);
(Continued)

(58) Field of Classification Search
CPC ........... A24F 40/20; A24F 40/40; A24F 40/46
See application file for complete search history.

(56) References Cited

U.S. PATENT DOCUMENTS

2019/0082735 A1 3/2019 Phillips et al.
2019/0320717 A1 10/2019 Tabasso et al.
(Continued)

FOREIGN PATENT DOCUMENTS

CN 107183789 A 9/2017
CN 108371351 A 8/2018
(Continued)

OTHER PUBLICATIONS

Combined Russian Office Action and Search Report issued Apr. 3, 2025 in Russian Patent Application No. 2023117448/03 (with English Translation of Office Action only), 10 pages.
(Continued)

*Primary Examiner* — Eric Yaary
(74) *Attorney, Agent, or Firm* — Oblon, McClelland, Maier & Neustadt, L.L.P.

(57) ABSTRACT

An aerosol-generating device is provided, including: an outer housing; a heater configured to heat an aerosol-forming substrate; and a plurality of layers of thermal insulation arranged around at least a part of the heater, the plurality of layers of thermal insulation including a first thermal insulation layer, a second thermal insulation layer, a radiation reflector layer being arranged between the first and the second thermal insulation layers, and a heat spreader layer including the outer housing of the aerosol-generating
(Continued)

device. An aerosol-generating system is also provided, including the aerosol-generating device and an aerosol-generating article including an aerosol-generating substrate.

14 Claims, 3 Drawing Sheets

(51) Int. Cl.

| | |
|---|---|
| ***A24F 40/46*** | (2020.01) |
| ***B32B 5/18*** | (2006.01) |
| ***B32B 9/00*** | (2006.01) |
| ***B32B 9/04*** | (2006.01) |
| ***B32B 15/04*** | (2006.01) |
| ***B32B 15/20*** | (2006.01) |
| ***B32B 27/06*** | (2006.01) |
| ***F16L 59/02*** | (2006.01) |
| ***H05B 3/46*** | (2006.01) |

(52) U.S. Cl.
CPC ............ *B32B 9/046* (2013.01); *B32B 15/046* (2013.01); *B32B 15/20* (2013.01); *B32B 27/065* (2013.01); *F16L 59/029* (2013.01); *H05B 3/46* (2013.01); *B32B 2266/0214* (2013.01); *B32B 2266/126* (2016.11); *B32B 2307/302* (2013.01); *B32B 2307/304* (2013.01); *B32B 2307/7376* (2023.05)

(56) References Cited

U.S. PATENT DOCUMENTS

| | | | | |
|---|---|---|---|---|
| 2021/0352966 | A1 | 11/2021 | Reevell | |
| 2023/0078670 | A1 * | 3/2023 | Fraser | H05B 3/42 131/329 |

FOREIGN PATENT DOCUMENTS

| | | | |
|---|---|---|---|
| CN | 109330030 | A | 2/2019 |
| CN | 109674095 | A | 4/2019 |
| CN | 209628627 | U | 11/2019 |
| CN | 110584216 | A | 12/2019 |
| JP | 2014-518367 | A | 7/2014 |
| JP | 2016-534730 | A | 11/2016 |
| RU | 2 595 971 | C2 | 8/2016 |
| RU | 2 636 649 | C1 | 11/2017 |
| RU | 2 728 556 | C2 | 7/2020 |
| WO | WO 2016/026219 | A1 | 2/2016 |
| WO | WO 2019/015343 | A1 | 1/2019 |
| WO | WO 2019/072131 | A1 | 4/2019 |
| WO | WO 2020/074601 | A1 | 4/2020 |
| WO | WO 2020/087516 | A1 | 5/2020 |
| WO | WO 2020/225098 | A1 | 11/2020 |

OTHER PUBLICATIONS

Extended European Search Report issued Jun. 2, 2021 in European Patent Application No. 20212009.3, 8 pages.
International Search Report and Written Opinion issued Apr. 4, 2022 in PCT/EP2021/084048 filed on Dec. 2, 2021, 12 pages.
Office Action and Search Report dated Mar. 7, 2026 issued in corresponding Chinese Patent Application No. 202180079569.X (with English translation).
Office Action dated Dec. 15, 2025 issued in corresponding Japanese patent application No. 2023-532367 (with English translation).

* cited by examiner

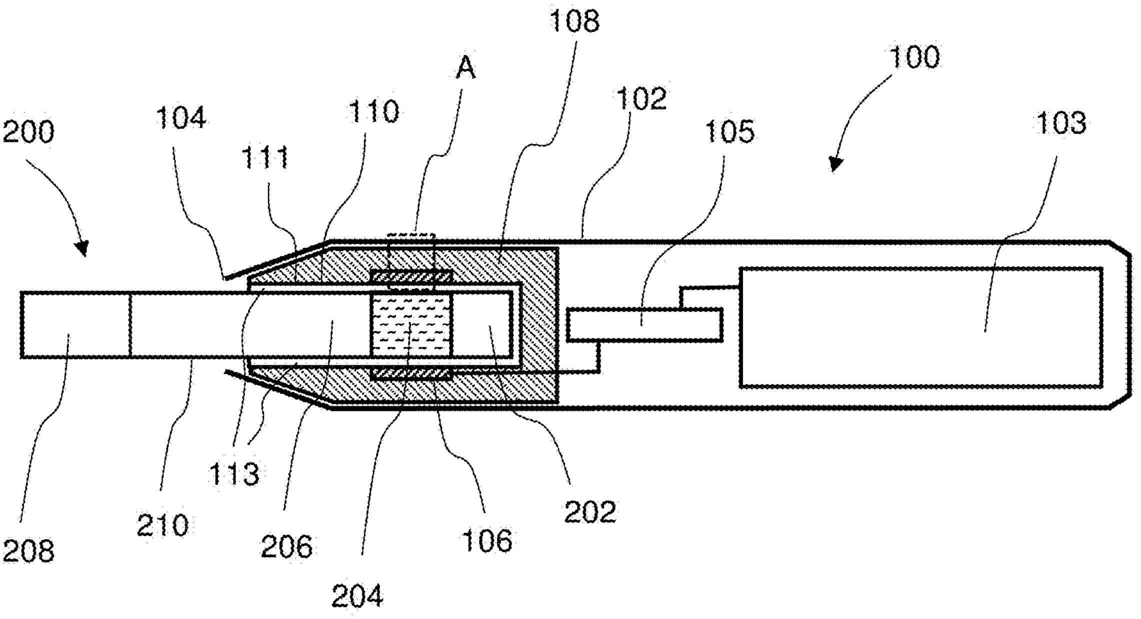
FIG. 2
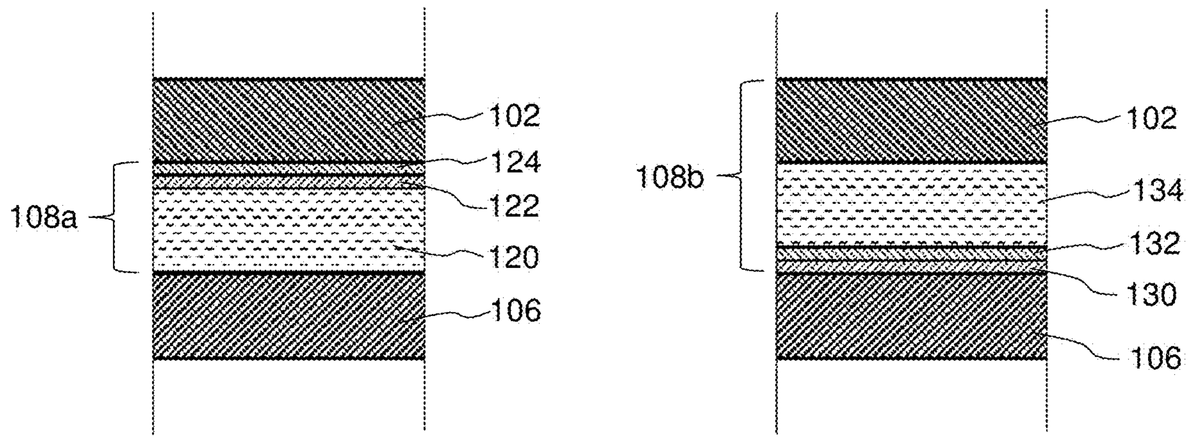
FIG. 3A
FIG. 3B

AEROSOL-GENERATING DEVICE HAVING MULTI-LAYER INSULATION

The present disclosure relates to an aerosol-generating device. In particular, but not exclusively, the present disclosure relates to a handheld electrically operated aerosol-generating device which is configured to heat an aerosol-forming substrate to generate an aerosol and to deliver the aerosol into the mouth of a user. The present invention also relates to an aerosol-generating system comprising an aerosol-generating device and an aerosol-generating article for use with the aerosol-generating device.

Aerosol generating devices in which an aerosol-forming substrate is heated to produce an aerosol are known in the art. Such devices typically comprise a housing holding a battery and control electronics, a portion or cavity for receiving or holding an aerosol-forming substrate, an electric heater arranged to heat the aerosol-forming substrate to generate an aerosol and a mouthpiece for delivering the generated aerosol to a user.

The aerosol-forming substrate can be a solid aerosol-forming substrate, for example, in the form of a tobacco rod or a tobacco plug. The solid aerosol-forming substrate can be heated using heaters positioned externally of the substrate or internally of the substrate. Alternatively, the aerosol-forming substrate can be a liquid aerosol-forming substrate. In which case, the heater typically comprises a heating element in the form of a coil of wire which is wound around an elongate wick which transfers liquid aerosol-forming substrate from a liquid storage portion to the heating element.

A problem that may be encountered with electrically operated aerosol-generating devices is that the outer housing of the device can become hot due to heat being transferred from the heater to the outer housing. In particular, the region of the outer housing immediately overlying the heater may become particularly hot, creating a so-called “hot spot” on the outer housing. The problem is more pronounced in devices in which the heater is positioned externally of the aerosol-forming substrate because in such devices the heater is closer to the outer housing of the device. If the temperature of the outer housing rises above 50 degrees centigrade then the aerosol-generating device can become uncomfortable for a user to hold.

It would be desirable to provide an aerosol-generating device which reduces heat transfer from the heater to the housing of the device. It would also be desirable to provide an aerosol-generating device which remains comfortable to hold throughout use of the device.

According to an example of the present disclosure, there is provided an aerosol-generating device. The aerosol-generating device may comprise a heater for heating an aerosol-forming substrate. The aerosol-generating device may comprise a plurality of layers of thermal insulation arranged around at least a part of the heater. The plurality of layers of thermal insulation may comprise a heat spreader layer.

According to an example of the present disclosure, there is provided an aerosol-generating device comprising: a heater for heating an aerosol-forming substrate; and a plurality of layers of thermal insulation arranged around at least a part of the heater, wherein the plurality of layers of thermal insulation comprises a heat spreader layer.

As used herein, the term “heat spreader” or “heat spreader layer” refers to a heat exchanger which transfers heat between a heat source and a heat sink or secondary heat exchanger whose surface area and geometry is generally larger than that of the heat source. The heat sink or secondary heat exchanger can be air or surrounding atmosphere and the heat spreader may, for example, be a single piece or sheet of material. In which case, the heat spreader functions by distributing heat across the area of the sheet. The heat sink or secondary heat exchanger can be another object at a lower temperature than the heat source.

Advantageously, the heat spreader layer helps to spread heat out over its area to reduce the formation of hotspots on the surface of an outer housing. An advantage of using a plurality of layers of thermal insulation as opposed to a single layer of thermal insulation is that the different properties of the different insulation layers can be exploited. For example, in the above-described arrangement, the heat spreader layer of the plurality of layers of thermal insulation facilitates the spreading out of heat whilst another thermal insulation layer in the plurality of layers of thermal insulation assists in reducing or slowing the transfer of heat to an outer housing of the device. This therefore improves the thermal insulation properties of the device compared to using just a single thermal insulation layer. The aerosol-generating device is more comfortable to hold as the outer temperature of the device is lower and the occurrence of hot spots is reduced. In addition, the space within a handheld, electrically operated aerosol-generating device for accommodating insulation is limited. The inventors have found that using multiple thinner layers of thermal insulation achieves improved thermal performance compared to using a single thicker layer of insulation.

A further advantage of reducing heat transfer to the outer housing of the aerosol-generating device is that more heat may be retained by the device for heating the aerosol-forming substrate leading to improved aerosol generation.

The plurality of layers of thermal insulation may comprise a first thermal insulation layer. The plurality of layers of thermal insulation may comprise a second thermal insulation layer. Advantageously, each of the first and second thermal insulation layers help to reduce heat transfer from the heater to an outer housing of the aerosol-generating device via conduction and convection.

The plurality of layers of thermal insulation may further comprise a radiation reflector layer. As used herein, the term “radiation reflector” refers to an object which reflects thermal radiation. For example, the radiation reflector may comprise a sheet of material that reflects thermal radiation. Accordingly, the radiation reflector reduces heat transfer by radiation by blocking or preventing a portion of the incident thermal radiation from passing through the reflector. The radiation reflector therefore acts as a radiative reflective insulator.

Advantageously, the radiant reflector helps to reduce heat transfer to an outer housing of the aerosol-generating device via radiation.

Preferably, the radiation reflector is spaced apart from the heater.

The radiation reflector layer may be arranged between the first and second thermal insulation layers. This arrangement prevents the radiation reflector from coming into direct contact with the heater and avoids heat transfer through the radiation reflector via conduction. It also helps reduce potential tarnishing or degradation of the reflective surface of the radiation reflect which may be caused by heater being in direct contact with the radiation reflector. In addition, this arrangement provides an object to reflect heat back into, that is, the heater and one of the first and second thermal insulation layers arranged inwardly of the radiation reflector can receive reflected heat from the radiation reflector.

The radiant reflector may be made from any suitable material capable of generating a reflective surface. Suitable materials include, but are not limited to, metals, metal alloys, metallised polymers, glass or ceramic.

The plurality of layers of thermal insulation may be arranged around or circumscribe substantially all of an external surface of the heater to provide thermal insulation in a radial direction. A dimension of the plurality of layers of thermal insulation may be larger than a dimension of the heater such that the plurality of layers of thermal insulation extend beyond the heater to provide a larger insulating surface. In particular, a length of the plurality of layers of thermal insulation may be longer than a length of the heater.

At least one layer of insulation may be arranged at or opposing one end of the heater, that is, across a longitudinal axis of the aerosol-generating device to provide thermal insulation in an axial direction. The at least one layer of insulation may be arranged between the heater and control circuitry of the aerosol-generating device. The at least one layer of insulation may comprise a plurality of layers of thermal insulation.

The heat spreader layer may be the outermost layer of the plurality of layers of thermal insulation. With this arrangement, any heat which passes through the first and second thermal insulation layers is spread out over the area of the heat spreader which reduces the likelihood of a hotspot occurring.

The heat spreader layer may be arranged between the first and second thermal insulation layers. With this arrangement, any heat which passes through one of the first and second thermal insulation layers is spread out over the area of the heat spreader and the other of the first and second thermal insulation layers provides a further layer of insulation to reduce heat transfer from the heater spreader. This arrangement reduces the likelihood of a hotspot occurring.

The heat spreader layer may be formed from a material having a thermal conductivity of at least 200 W/m·K, preferably of at least 300 W/m·K and more preferably of at least 400 W/m·K. These ranges of thermal conductivities have been found to be effective at spreading out or distributing heat over the area of the heat spreader layer.

The heat spreader layer may be anisotropic such that the thermal conductivity in directions substantially parallel to the heat spreader layer is higher compared to the thermal conductivity in a direction substantially perpendicular to the heat spreader layer. This anisotropy means that more heat is spread out or distributed over the heat spreader layer than pass through the thickness of the heat spreader layer. Such an anisotropic heat spreader layer is therefore more efficient in spreading or distributing heat compared to an isotropic heat spreader, which conducts heat equally in all directions, and reduces the likelihood of a hotspot occurring.

The thermal conductivity of the heat spreader layer in directions substantially parallel to the heat spreader layer may be at least 700 W/m·K, preferably at least 1100 W/m·K and more preferably at least 1500 W/m·K. The thermal conductivity in directions substantially parallel to the heat spreader layer may be between 700 W/m·K and 2000 W/m·K, preferably between 1100 W/m·K and 2000 W/m·K and more preferably between 1500 W/m·K and 2000 W/m·K. These ranges of thermal conductivities have been found to be effective at spreading out or distributing heat over the area of the heat spreader layer.

The thermal conductivity of the heat spreader layer in directions substantially perpendicular to the heat spreader layer may be 50 W/m·K or less, preferably 40 W/m·K or less and more preferably 30 W/m·K or less.

The heat spreader layer may be made from any suitable material capable of effectively spreading heat. Suitable materials include, but are not limited to, metals and metal alloys, such as aluminium and copper, and graphite. Preferably, the heat spreader layer may comprise graphite. More preferably, the heat spreader layer may comprise a pyrolytic graphite sheet. Graphite has been found to be a particularly effective heat spreading material.

The heat spreader layer may comprise a housing of the aerosol-generating device. Such an arrangement avoids the need to include a separate heat spreader layer and utilises a housing of the aerosol-generating device to spread heat. The outer housing spreads out heat received from the first and second thermal insulation layers over at least a portion of the area of the outer housing from where heat can be dissipated to the surrounding air.

Alternatively, the aerosol-generating device may further comprise a housing in addition to the heat spreader layer, which housing performs a further heat spreading function.

The housing may be formed from a material having a thermal conductivity of at least 200 W/m·K, preferably of at least 300 W/m·K and more preferably of at least 400 W/m·K. These ranges of thermal conductivities have been found to be effective at spreading out or distributing heat over the surface area of the outer housing.

The housing may be made from any suitable material capable of effectively spreading heat. Suitable materials include, but are not limited to, metals and metal alloys, such as aluminium and copper.

The thermal conductivity of the first thermal insulation layer may be 0.050 W/m·K or less, preferably 0.040 W/m·K or less and more preferably 0.030 W/m·K or less. The thermal conductivity of the second thermal insulation layer may be 0.050 W/m·K or less, preferably 0.040 W/m·K or less and more preferably 0.030 W/m·K or less. These ranges of thermal conductivities have been found to be effective at reducing or slowing heat transfer through the first and second thermal insulation layers.

The first thermal insulation layer may have an operating temperature in excess of 200 degrees centigrade, preferably in excess of 250 degrees centigrade.

The second thermal insulation layer may have an operating temperature in excess of 200 degrees centigrade, preferably in excess of 250 degrees centigrade.

As used herein, the term "operating temperature" refers to a temperature at which a material can be used without undergoing appreciable degradation or loss of mechanical or thermal performance.

The first thermal insulation layer may be made from any suitable material having the required thermal conductivity. Suitable materials include, but are not limited to, polymers, ceramic or glass and the material may be formed as particles, beads, films, sheets, foams, fibres, aerogels or blocks. For example, the first thermal insulation layer may be formed from polyimide aerogel, polyimide foam, ceramic paper, aramid fibre paper, polyimide film, silicone foam or sponge, polymer aerogel, rubber, or aerogel particles or a combination thereof. The first thermal insulation layer may be gaseous. The first thermal insulation layer may be air.

The second thermal insulation layer may be made from any suitable material having the required thermal conductivity. Suitable materials include, but are not limited to, polymers, ceramic or glass and the material may be formed as particles, beads, films, sheets, foams, fibres, aerogels or blocks. For example, the first thermal insulation layer may be formed from polyimide aerogel, polyimide foam, ceramic paper, aramid fibre paper, polyimide film, silicone foam or sponge, polymer aerogel, rubber, or aerogel particles or a combination thereof. The second thermal insulation layer may be gaseous. The second thermal insulation layer may be air.

The overall thickness of the plurality of layers of thermal insulation within the aerosol-generating device may be 2 mm or less and preferably may be 1.75 mm or less. This overall thickness allows the plurality of layers of thermal insulation to fit within a handheld, electrically operated aerosol-generating device, where space is limited. Such a thickness also avoids having to make the dimensions of the aerosol-generating device larger to accommodate the insulation layers.

The first thermal insulation layer may have an uncompressed thickness of 3.0 mm or less and preferably 2.5 mm or less. The first thermal insulation layer may have an uncompressed thickness from about 0.125 mm to about 2.5 mm, preferably from about 1 mm to about 2.5 mm and more preferably from about 1.5 mm to about 2.5 mm. This has been found to be a suitable range of thicknesses for the first thermal insulation layer to effectively reduce or slow heat transfer.

The first thermal insulation layer may comprise a film. The first thermal insulation layer may have a thickness from about 0.010 mm to about 1 mm and preferably from about 0.020 mm to about 0.75 mm.

The second thermal insulation layer may have an uncompressed thickness of 3.0 mm or less and preferably 2.5 mm or less. The second thermal insulation layer may have an uncompressed thickness from about 0.125 mm to about 2.5 mm, preferably from about 1 mm to about 2.5 mm and more preferably from about 1.5 mm to about 2.5 mm. This has been found to be a suitable range of thicknesses for the second thermal insulation layer to effectively reduce or slow heat transfer.

The second thermal insulation layer may comprise a film. The second thermal insulation layer may have a thickness from about 0.010 mm to about 1 mm and preferably from about 0.020 mm to about 0.75 mm.

The heater may comprise one or more electric heating elements. The electric heating elements may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal™, Kanthal™ and other iron-chromium-aluminium alloys, and iron-manganese-aluminium based alloys. In composite materials, the electrically resistive material may optionally be embedded in, encapsulated or coated with an insulating material or vice-versa, depending on the kinetics of energy transfer and the external physicochemical properties required. Alternatively, the electric heaters may comprise one or more infra-red heating elements, photonic sources, or inductive heating elements.

The one or more heating elements may be formed using a metal or metal alloy having a defined relationship between temperature and resistivity. Heating elements formed in this manner may be used to both heat and monitor the temperature of the heating element during operation.

The heating element may be deposited in or on a rigid carrier material or substrate. The heating element may be formed as a track on a suitable insulating material, such as ceramic or glass. The heating element may be sandwiched between two insulating materials.

The heater may comprise an internal heater or an external heater, or both internal and external heaters, where "internal" and "external" refer to a position relative to the aerosol-forming substrate.

The internal heater may take any suitable form. For example, the internal heater may take the form of a heating blade. Alternatively, the internal heater may take the form of a casing or substrate having different electro-conductive portions, or an electrically resistive metallic tube. Alternatively, the internal heater may be one or more heating needles or rods that run through the centre of the aerosol-forming substrate. Other alternatives include a heating wire or filament, for example a Ni—Cr (Nickel-Chromium), platinum, gold, silver, tungsten or alloy wire or a heating plate.

The external heater may take any suitable form. For example, the external heater may take the form of one or more flexible heating foils on a dielectric substrate, such as polyimide. The flexible heating foils can be shaped to conform to the perimeter of the substrate receiving cavity. Alternatively, the external heater may take the form of a heating coil, a metallic grid or grids, a flexible printed circuit board, a moulded interconnect device (MID), ceramic heater, flexible carbon fibre heater or may be formed using a coating technique, such as plasma vapour deposition, on a suitable shaped substrate.

The heater may be a tubular heater which is arranged to receive an aerosol-forming substrate or aerosol-generating article within an internal space of the tube. The tubular heater may comprise a tubular support or substrate having a heating element disposed on or within the support or substrate. The heating element may be disposed on an inside surface of the tube or an outside surface of the tube. In one embodiment, the heater may comprise an aluminium oxide ceramic tube with a Kanthal™ heating element circumscribing the external cylindrical surface of the tube.

The aerosol-generating device may further comprise a heating chamber for containing or receiving an aerosol-generating article or an aerosol-forming substrate. The heater may be located within the heating chamber or external to the heating chamber or be part of the heating chamber.

The aerosol-generating device may further comprise a cavity for receiving an aerosol-forming substrate or an aerosol-generating article.

The aerosol-generating device may comprise a barrier for separating one or more of the plurality of layers of thermal insulation from an airflow pathway for conveying aerosol to a user. The barrier may line the cavity for receiving an aerosol-forming substrate or an aerosol-generating article.

The aerosol-generating device may further comprise a power supply or source for supplying power to the internal and external heaters. The power supply may be any suitable power supply, for example a DC voltage source. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate or a Lithium-Polymer battery.

In one embodiment, the aerosol-generating device further comprises a sensor to detect air flow indicative of a user taking a puff which enables puff based activation of the electric heater or an improved energy management of the electric heater. The sensor may be any of: a mechanical device, an electro-mechanical device, an optical device, an opto-mechanical device and a micro electro-mechanical systems (MEMS) based sensor. In that embodiment, the sensor may be connected to the power supply and the system is arranged to activate the electric heater when the sensor senses a user taking a puff. In an alternative embodiment, the aerosol-generating device further comprises a manually operable switch, for a user to initiate a puff or to enable a long-lasting experience.

The aerosol-generating device is preferably a handheld aerosol-generating device that is comfortable for a user to hold between the fingers of a single hand. The aerosol-generating device may be substantially cylindrical in shape. The aerosol-generating device may have a polygonal cross section and a protruding button formed on one face: in this embodiment, the external diameter of the aerosol-generating device may be between about 12.7 mm and about 13.65 mm measured from a flat face to an opposing flat face; between about 13.4 mm and about 14.2 mm measured from an edge to an opposing edge (that is, from the intersection of two faces on one side of the aerosol-generating device to a corresponding intersection on the other side); and between about 14.2 mm and about 15 mm measured from a top of the button to an opposing bottom flat face. The length of the aerosol-generating device may be between about 70 mm and 120 mm.

The aerosol-generating device may further comprise control circuitry configured to control a supply of electrical power to the heater assembly. The control circuitry may comprise a microprocessor. The microprocessor may be a programmable microprocessor, a microcontroller, or an application specific integrated chip (ASIC) or other electronic circuitry capable of providing control. The control circuitry may comprise further electronic components. For example, in some embodiments, the control circuitry may comprise any of: sensors, switches, display elements. Power may be supplied to the heater assembly continuously following activation of the device or may be supplied intermittently, such as on a puff-by-puff basis. The power may be supplied to the heater assembly in the form of pulses of electrical current, for example, by means of pulse width modulation (PWM).

The housing of the aerosol-generating device may be elongate. The housing may comprise a two-part housing: a first housing part containing a power source and control circuitry; and a second housing part containing the heater and cavity for receiving an aerosol-forming substrate or aerosol-generating article. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material is preferably light and non-brittle.

According to an example of the present disclosure, there is provided an aerosol-generating system comprising an aerosol-generating device according to any of the examples described above. The aerosol-generating system may comprise an aerosol-generating article comprising an aerosol-forming substrate.

According to an example of the present disclosure, there is provided an aerosol-generating system comprising: an aerosol-generating device according to any of the examples described above; and an aerosol-generating article comprising an aerosol-forming substrate.

As used herein, the term "aerosol-generating article" refers to an article comprising an aerosol-forming substrate that, when heated in an aerosol-generating device, releases volatile compounds that can form an aerosol. An aerosol-generating article is separate from and configured for combination with an aerosol-generating device for heating the aerosol-generating article.

The terms "distal", "upstream" "proximal" and "downstream" are used to describe the relative positions of components, or portions of components, of an aerosol-generating device and aerosol generating article. Aerosol generating articles and devices according to the present disclosure have a proximal end through which, in use, an aerosol exits the article or device for delivery to a user, and have an opposing distal end. The proximal end of the aerosol generating article and device may also be referred to as the mouth end. In use, a user draws on the proximal end of the aerosol generating article or device in order to inhale an aerosol generated by the aerosol generating article or device. The terms upstream and downstream are relative to the direction of aerosol movement through the aerosol generating article when a user draws on the proximal end. The proximal end of the aerosol-generating article is downstream of the distal end of the aerosol-generating article. The proximal end of the aerosol-generating article may also be referred to as the downstream end of the aerosol-generating article and the distal end of the aerosol-generating article may also be referred to as the upstream end of the aerosol-generating article.

In one embodiment, the aerosol-generating article may consist solely of the aerosol-forming substrate. During operation, the aerosol-forming substrate may be completely contained within the aerosol-generating device. In that case, a user may puff on a mouthpiece of the aerosol-generating device. A mouthpiece may be any portion of the aerosol-generating device that is placed into a user's mouth in order to directly inhale an aerosol generated by the aerosol-generating article or aerosol-generating device. The aerosol is conveyed to the user's mouth through the mouthpiece.

In an alternative embodiment, the aerosol-generating article may comprise further components and, during operation, an aerosol-generating article containing the aerosol-forming substrate may be partially contained within the aerosol-generating device. In that case, the user may puff directly on the aerosol-generating article or a mouthpiece of the aerosol-generating article.

The aerosol-generating article may be substantially cylindrical in shape. The aerosol-generating article may be substantially elongate. The aerosol-forming substrate may be substantially cylindrical in shape. The aerosol-forming substrate may be substantially elongate.

The aerosol-generating article may have a total length between approximately 30 mm and approximately 100 mm. The aerosol-generating article may have an external diameter between approximately 5 mm and approximately 12 mm. The aerosol-forming substrate may have a length of between approximately 10 mm and approximately 18 mm. Further, the diameter of the aerosol-forming substrate may be between approximately 5 mm and approximately 12 mm. The aerosol-generating article may comprise a filter plug. The filter plug may be located at the downstream end of the aerosol-generating article. The filter plug may be a cellulose acetate filter plug. The filter plug is approximately 7 mm in length in one embodiment, but may have a length of between approximately 5 mm to approximately 12 mm.

In one embodiment, the aerosol-generating article may have a total length of approximately 45 mm. The aerosol-generating article may have an external diameter of approximately 7.3 mm but may have an external diameter of between approximately 7.0 mm and approximately 7.4 mm. Further, the aerosol-forming substrate may have a length of approximately 12 mm. Alternatively, the aerosol-forming substrate may have a length of approximately 16 mm. The aerosol-generating article may comprise an outer paper wrapper. Further, the aerosol-generating article may comprise a separation between the aerosol-forming substrate and the filter plug. The separation may be approximately 21 mm or approximately 26 mm, but may be in the range of approximately 5 mm to approximately 28 mm. The separation may be provided by a hollow tube. The hollow tube may be a made from cardboard or cellulose acetate.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise comminuting one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

In a particularly preferred embodiment, the aerosol-forming substrate comprises a gathered crimpled sheet of homogenised tobacco material. As used herein, the term 'crimped sheet' denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article. This advantageously facilitates gathering of the crimped sheet of homogenised tobacco material to form the aerosol-forming substrate. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled. In certain embodiments, the aerosol-forming substrate may comprise a gathered sheet of homogenised tobacco material that is substantially evenly textured over substantially its entire surface. For example, the aerosol-forming substrate may comprise a gathered crimped sheet of homogenised tobacco material comprising a plurality of substantially parallel ridges or corrugations that are substantially evenly spaced-apart across the width of the sheet.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

Although reference is made to solid aerosol-forming substrates above, it will be clear to one of ordinary skill in the art that other forms of aerosol-forming substrate may be used with other embodiments. For example, the aerosol-forming substrate may be a liquid aerosol-forming substrate. If a liquid aerosol-forming substrate is provided, the aerosol-generating device preferably comprises means for retaining the liquid. For example, the liquid aerosol-forming substrate may be retained in a container or a liquid storage portion. Alternatively or in addition, the liquid aerosol-forming substrate may be absorbed into a porous carrier material. The porous carrier material may be made from any suitable absorbent plug or body, for example, a foamed metal or plastics material, polypropylene, terylene, nylon fibres or ceramic. The liquid aerosol-forming substrate may be retained in the porous carrier material prior to use of the aerosol-generating device or alternatively, the liquid aerosol-forming substrate material may be released into the porous carrier material during, or immediately prior to use. For example, the liquid aerosol-forming substrate may be provided in a capsule. The shell of the capsule preferably melts upon heating and releases the liquid aerosol-forming substrate into the porous carrier material. The capsule may optionally contain a solid in combination with the liquid.

Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

Features described in relation to one of the above examples may equally be applied to other examples of the present disclosure.

The invention is defined in the claims. However, below there is provided a non-exhaustive list of non-limiting examples. Any one or more of the features of these examples may be combined with any one or more features of another example, embodiment, or aspect described herein.

Example Ex1: An aerosol-generating device comprising: a heater for heating an aerosol-forming substrate; and at least one layer of thermal insulation arranged around at least a part of the heater.

Example Ex2: An aerosol-generating device comprising: a heating chamber for heating an aerosol-forming substrate; and at least one layer of thermal insulation arranged around at least a part of the heating chamber.

Example Ex3: An aerosol-generating device according to Example Ex1 or Ex2, wherein the aerosol-generating device comprises a plurality of layers of thermal insulation arranged around at least a part of the heater.

Example Ex4: An aerosol-generating device according to any of the preceding examples, wherein the at least one layer of thermal insulation or the plurality of layers of thermal insulation comprises a heat spreader layer.

Example Ex5: An aerosol-generating device according to Example Ex3 or Ex4, wherein the plurality of layers of thermal insulation further comprises a first thermal insulation layer.

Example Ex6: An aerosol-generating device according to Example Ex5, wherein the plurality of layers of thermal insulation further comprises a second thermal insulation layer.

Example Ex7: An aerosol-generating device according to any of Examples Ex3 to Ex6, wherein the plurality of layers of thermal insulation further comprises a radiation reflector layer.

Example Ex8: An aerosol-generating device according to Example Ex7, wherein the radiation reflector layer is arranged between the first and second thermal insulation layers.

Example Ex9: An aerosol-generating device according to any of Examples Ex4 to Ex8, wherein the heat spreader layer is the outermost layer of the plurality of layers of thermal insulation.

Example Ex10: An aerosol-generating device according to any of Examples Ex6 to Ex9, wherein the heat spreader layer is arranged between the first and second thermal insulation layers.

Example Ex11: An aerosol-generating device according to any of Examples Ex4 to Ex10, wherein the heat spreader layer is formed from a material having a thermal conductivity of at least 200 W/m·K.

Example Ex12: An aerosol-generating device according to any of Examples Ex4 to Ex11, wherein the heat spreader layer is anisotropic such that the thermal conductivity in directions substantially parallel to the heat spreader layer is higher compared to the thermal conductivity in a direction substantially perpendicular to the heat spreader layer.

Example Ex13: An aerosol-generating device according to Example Ex12, wherein the thermal conductivity in directions substantially parallel to the heat spreader layer is at least 700 W/m·K.

Example Ex14: An aerosol-generating device according to any of Examples Ex4 to Ex13, wherein the heat spreader layer comprises graphite.

Example Ex15: An aerosol-generating device according to any of Examples Ex4 to Ex13, wherein the heat spreader layer comprises a housing of the aerosol-generating device.

Example Ex16: An aerosol-generating device according to any of the preceding examples, further comprising a housing, wherein the housing is formed from a material having a thermal conductivity of at least 200 W/m·K.

Example Ex17: An aerosol-generating device according to any of Examples Ex6 to Ex16, wherein the thermal conductivity of the first and second thermal insulation layers is 0.050 W/m·K or less, preferably 0.040 W/m·K or less and more preferably 0.030 W/m·K or less.

Example Ex18: An aerosol-generating device according to any of Examples Ex3 to Ex17, wherein the overall thickness of the plurality of layers of thermal insulation within the aerosol-generating device is less than 2 mm.

Example Ex19: An aerosol-generating device according to any preceding example, wherein the heater is a tubular heater and is arranged to receive an aerosol-generating article within an internal space of the tube.

Example Ex20: An aerosol-generating device according to Example Ex19, wherein the tubular heater comprises a tubular substrate having a heating element disposed on or within the substrate.

Example Ex21: An aerosol-generating device according to Example Ex19 or Ex20, wherein the heating element is disposed on an external surface of the tube.

Example Ex22: An aerosol-generating device according to any preceding example, further comprising a cavity for receiving an aerosol-generating article.

Example Ex23: An aerosol-generating device according to any of Examples Ex3 to Ex22, further comprising a barrier for separating one or more of the plurality of layers of thermal insulation from an airflow pathway for conveying aerosol to a user.

Example Ex24: An aerosol-generating device according to Example Ex23, wherein the barrier lines a cavity for receiving an aerosol-generating article.

Example Ex25: An aerosol-generating system comprising: an aerosol-generating device according to any of Examples Ex1 to Ex24; and an aerosol-generating article comprising an aerosol-forming substrate.

Examples will now be further described with reference to the figures in which:

FIG. 2 is a schematic drawing of the interior of an aerosol-generating device in accordance with another embodiment showing an aerosol-generating article received within the device.

FIG. 3A is an enlarged cross-section of the area labelled A in FIG. 2 and shows a heater and multi-layer insulation arrangement in accordance with one embodiment.

FIG. 3B is an enlarged cross-section of the area labelled A in FIG. 2 and shows a heater and multi-layer insulation arrangement in accordance with another embodiment.

Figure 1:
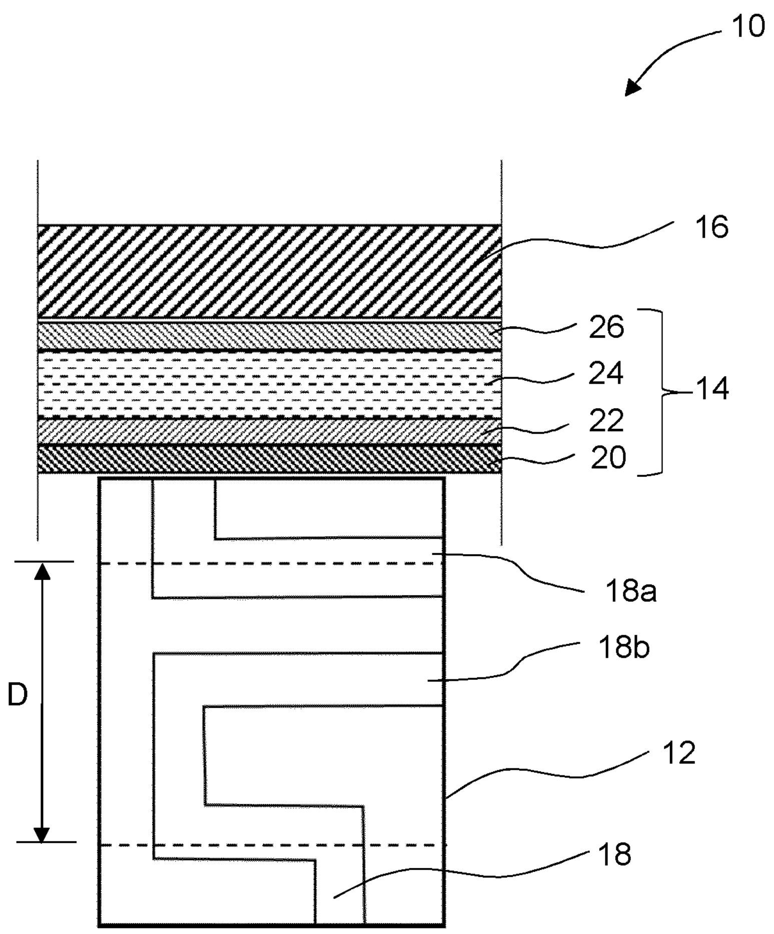
FIG. 1 is a schematic partial cross-section of part of an aerosol-generating device in accordance with one embodiment showing an electric heater and multi-layer insulation.

FIG. 1 shows part of an aerosol-generating device 10 having an electric heater 12 and a plurality of layers of thermal insulation 14 arranged between the electric heater 12 and a housing 16. The electric heater is tubular and has an internal space having a diameter D for receiving an aerosol-generating article (not shown) of similar diameter. The electric heater is therefore positioned externally to an aerosol-forming substrate within the aerosol-generating article. The tubular structure of the electric heater 12 is made from aluminium oxide ceramic and a heating element 18 made from Kanthal™ circumscribes its outer cylindrical surface in a serpentine or undulating fashion. The heating element 18 has two ends 18*a* and 18*b* arranged at one end of the electric heater 12 and connected to electrical leads (not shown) for connecting the electric heater 12 to a power source (not shown) via control circuitry (not shown). The electric heater 12 is configured to be heated to a temperature of approximately 210 degrees centigrade to heat an aerosol-forming substrate to generate an aerosol.

FIG. 1 shows a general structure for a plurality of layers of thermal insulation 14 in accordance with the present disclosure, which comprises a first thermal insulation layer 20, a radiation reflector 22, a second thermal insulation layer 24 and a heat spreader layer 26. At least one of the layers, for example, the radiation reflector 22, is optional and may be omitted in certain embodiments, as discussed below. Furthermore, the heat spreader layer 26 may be replaced by another component of the aerosol-generating device 10, for example, the outer housing 16, which is the case in one of the embodiments discussed below.

The first thermal insulation layer 20 has a high operating temperature (that is, around 250 degrees centigrade or more) so that it is capable of withstanding the operating temperature of the heater 12. In addition to being a thermal insulator, the first thermal insulation layer 20 is also an electrical insulator to avoid short circuiting the connections of any electrical components it may come into contact with. A thin film insulator such as Kapton™ tape may be used. Alternatively, thicker foam or aerogel insulators may be used.

The radiation reflector 22 is arranged adjacent to, and outward of, the first thermal insulation layer 20, although it may be located differently. The radiation reflector 22 is generally formed from a thin metallic foil or a metallised material having a reflective surface facing the heater 12. It is important that the radiation reflector 22 is spaced apart from the heater 12, for example, by air or a layer of thermal insulation, so that there is space into which thermal radiation can be reflected. Furthermore, if the radiation reflector 22 were located in contact with the heater, heat would be transfer by conduction through the radiation reflector 22 reducing its effectiveness and risking the reflective surface of the radiation reflector 22 becoming tarnished or otherwise degraded by the heater 12.

The second thermal insulation layer 24 is arranged adjacent to, and outward of, the radiation reflector 22, although it may be located differently. The second thermal insulation layer 20 has a high operating temperature (that is, around 200 degrees centigrade or more). The operating temperature of the second thermal insulation layer 24 does not need to be as high as the first thermal insulation layer 20 because it is located further away from the heater 12 and is at least partially protected by the first thermal insulation layer 20. A thin film insulator such as an aerogel film may be used or, alternatively, thicker foam or aerogel insulators may be used.

The heat spreader layer 26 is arranged adjacent to, and outward of, the second thermal insulation layer 24, although it may be located differently. The heat spreader layer 26 is typically made from a sheet of material or foil having high thermal conductivity (that is, at least 200 W/m·K). However, in preferred embodiments, an anisotropic heat spreader layer 26 is used such as a pyrolytic graphite sheet. This has relatively high thermal conductivity (that is, greater than 700 W/m·K) in directions parallel to the plane of the sheet (that is, in the x-y directions) and relatively low thermal conductivity (that is, less than 30 W/m·K) in directions perpendicular to the sheet (that is, the z direction). Consequently, the heat spreader layer 26 spreads or distributes heat effectively within the layer, that is, in directions parallel to the heat spreader layer 26, but reduces heat transfer through the thickness of the layer, that is, in directions perpendicular to the heat spreader layer 26. By spreading out the heat, the heat spreader layer 26 helps to reduce the risk of hotspots forming on the outer surface of the housing 16. By reducing heat transfer through the thickness of the layer, the heat spreader layer 26 effectively helps to insulate the housing from the heat generated by the heater 12.

The housing 16 is arranged adjacent to, and outward of, the heat spreader layer 26. The plurality of layers of thermal insulation 14 helps to reduce the transfer of heat from the heater 12 to the outer housing 16, thereby reducing the likelihood of the outer housing, or a portion of it, becoming too hot (that is, exceeding a temperature of 50 degrees centigrade) and maintaining the housing 16 a temperature which is not uncomfortable for a user to hold. In this example, the housing 16 is made from a polyether ether ketone (PEEK), which itself is a reasonable thermal insulator. However, the housing 16 could be made from a material having a higher thermal conductivity so that the outer housing 16 also acts as a heat spreader.

FIG. 2 shows the interior of an aerosol-generating device 100 and an aerosol-generating article 200 received within the aerosol-generating device 100. Together, the aerosol-generating device 100 and aerosol-generating article 200 form an aerosol-generating system. In FIG. 2, the aerosol-generating device 100 is shown in a simplified manner. In particular, the elements of the aerosol-generating device 100 are not drawn to scale. Furthermore, elements that are not relevant for the understanding of this embodiment have been omitted.

The aerosol-generating device 100 comprises a housing 102 containing a power source 103, an electric heater 106, control circuitry 105 and a plurality of layers of thermal insulation 108. The power source 103 is a battery and, in this example, it is a rechargeable lithium ion battery. The control circuitry 105 is connected to both the power source 103 and the heater 106 and controls the supply of electrical energy from the power source 103 to the electric heater 106 to regulate the temperature of the electric heater 106.

The housing has an opening 104 at a proximal or mouth end of the aerosol-generating device 100 through which an aerosol-generating article 200 is received. The aerosol-generating device 100 and plurality of layers of thermal insulation 108, are shown in cross-section in FIG. 2. The plurality of layers of thermal insulation 108 surrounds the heater 106 and a cavity 110 within the housing 102 in which the aerosol-generating article 200 is received. In particular, the plurality of layers of thermal insulation 108 both circumscribe the heater 106 and cavity 110 to reduce heat transfer to the housing 102 and are arranged across a distal end of the cavity 110 to reduce heat transfer to the control circuitry 105. The plurality of layers of thermal insulation 108 can have various different arrangements of thermal insulation layers, two of which are described below with reference to FIGS. 3A and 3B.

The heater 106 is tubular and has the same design as the heater in FIG. 1. The aerosol-generating article 200 passes through the internal space in the tubular heater 106 when the aerosol-generating article 200 is received within the aerosol-generating device 100. The aerosol-generating device further comprises a barrier 111 for separating one or more of the plurality of layers of thermal insulation 108 from an airflow pathway 113 for conveying aerosol to a user.

The aerosol-generating article 200 comprises an end plug 202, an aerosol-forming substrate 204, a hollow tube 206, a mouthpiece filter 208 and a paper wrapper 210. The aerosol-forming substrate 204 comprises a plug of tobacco or tobacco-based material. When the aerosol-generating article 200 is fully received within the aerosol-generating device 100, the aerosol-forming substrate 204 is located within the heater 106 such that the heater 106 can heat the aerosol-forming substrate 204 to form an aerosol. The end plug 202 and mouthpiece filter 208 are formed from cellulose acetate fibres.

The aerosol-generating device 100 may further comprise: a sensor (not shown) for detecting the presence of the aerosol-generating article 200; a user interface (not shown) such as a button for activating the heater 106; and a display or indicator (not shown) for presenting information to a user, for example, remaining battery power, heating status and error messages.

FIGS. 3A and 3B are enlarged schematic views of the area labelled A in FIG. 2 and shows a cross-section through a part of the aerosol-generating device 100 comprising the heater 106, the plurality of layers of thermal insulation 108 and the housing 102. FIGS. 3A and 3B have been simplified and elements of the aerosol-generating device 100 are not drawn to scale.

Furthermore, a number of the thermal insulation layers in the plurality of layers of thermal insulation 108 are compressible because they are formed from foams or aerogels or another compressible structure. This is beneficial because it allows the plurality of layers of thermal insulation 108 to conform to changes in profile within the aerosol-generating device 100. As can be seen in FIG. 2, the internal profile along the aerosol-generating device changes, for example, at the points where the aerosol-generating article 200 passes into and out of the electric heater 106 and where the house tapers towards its mouth end. At points where the profile narrows, any compressible materials in the plurality of layers of thermal insulation 108 will be compressed. However, the inventors have found that the amount of compression involved does not adversely affect the thermal performance of the insulation layers to any appreciable extent. In the following discussion, any reference to a thickness of a material is to its uncompressed thickness.

FIG. 3A shows a first arrangement **108*a* of the plurality of layers of thermal insulation for use in the aerosol-generating device 100 of FIG. 2. The first arrangement 108*a* of the plurality of layers of thermal insulation comprises a first thermal insulation layer 120, a heat spreader layer 122 and a second thermal insulation layer 124**.

The first thermal insulation layer 120 comprises a polyimide aerogel sleeve having a thickness of 2.5 mm. A suitable polyimde aerogel sleeve includes, but is not limited to, a sleeve made from Airloy X116 polyimide aerogel manufactured by Aerogel Technologies of Boston, MA, USA.

The heat spreader layer 122 comprises a pyrolytic graphite sheet having a thickness of 25 microns. A suitable pyrolytic graphite sheet includes, but is not limited to, part number EYGA121803KV supplied by Panasonic of Newark, NJ, USA.

The second thermal insulation layer 124 comprises a polymer aerogel having a thickness of 1 mm. A suitable polymer aerogel includes, but is not limited to, Aerozero polymer film or block supplied by Blueshift Materials of Spencer, MA, USA.

FIG. 3B shows a second arrangement **108*b* of the plurality of layers of thermal insulation for use in the aerosol-generating device 100 of FIG. 2. The second arrangement 108*b* of the plurality of layers of thermal insulation comprises a first thermal insulation layer 130, a radiation reflector 132, a second thermal insulation layer 134 and the housing 102** forms a heat spreader layer.

The first thermal insulation layer 130 comprises a polyimide film having a thickness of 25 microns. A suitable polyimide film includes, but is not limited to, Kapton™ tape supplied by DuPont of Wilmington, DE, USA.

The radiation reflector 132 comprises an aluminium foil having a thickness of 0.016 mm. Any suitable aluminium foil of the required thickness may be used.

The second thermal insulation layer 134 comprises a polyimide foam having a thickness of 2.5 mm. A suitable polyimide foam includes, but is not limited to, Intek™ PFI-1120 polyimide foam supplied by Trelleborg of Trelleborg, Sweden.

To form a heat spreader layer, the polymer-based housing 102 of the aerosol-generating device of FIG. 2 is replaced with a tubular aluminium housing having an inside diameter of 17 mm and an outside diameter 18.5 mm. Aluminium has a higher thermal conductivity than plastic and helps to spread heat across the area of the housing. Any suitable aluminium housing may be used.

TESTING

To determine the thermal performance of using a plurality of layers of thermal insulation compared to just using a single layer, test examples of each of the arrangements of FIGS. 3A and 3B were prepared and were tested in the aerosol-generating device 100 of FIG. 2. As a control, further test examples comprising just a single layer of insulation were prepared and also tested in the aerosol-generating device 100 of FIG. 2.

To measure temperature, thermocouples were used and attached to relevant test points on the aerosol-generating device 100 as described below with respect to each test. The heater 106 was powered by an external laboratory power supply. The aerosol-generating device was held horizontal and stationary and was tested at an ambient temperature of approximately 23 to 25 degrees centigrade.

Figure 4A:
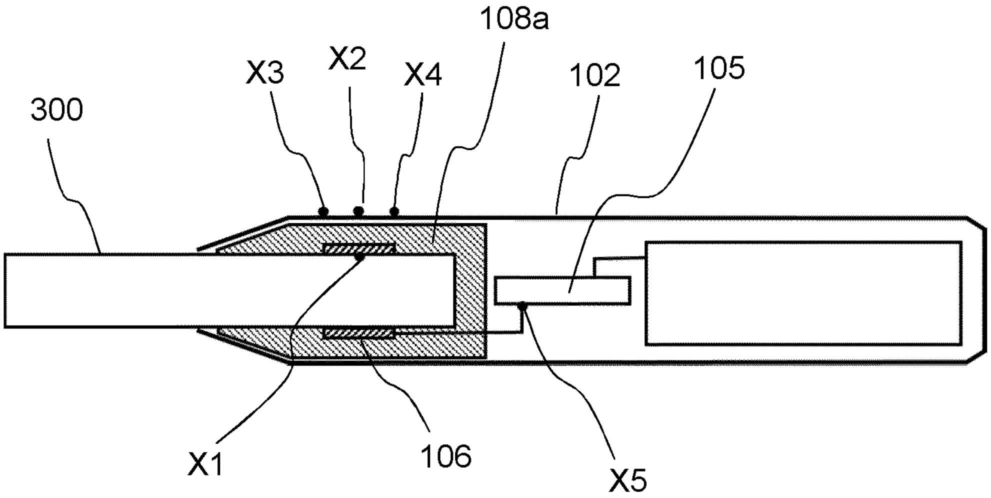
FIGS. 4A and 4B show two different test arrangements for testing the thermal insulation performance of an aerosol-generating device.
Figure 4B:
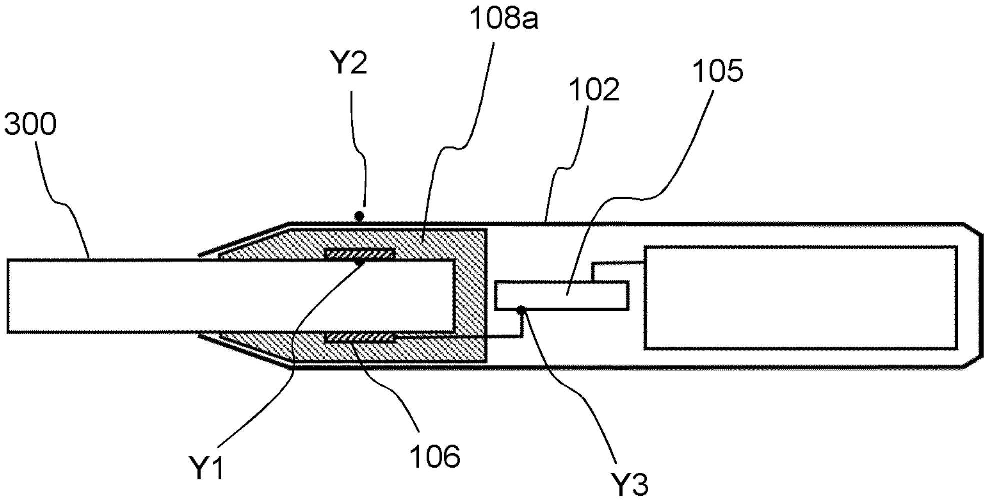

As can be seen in FIGS. 4A and 4B, an empty paper tube 300 without an aerosol-forming substrate or filters or plugs was used in the test in place of the aerosol-generating article 200 of FIG. 2. This is because some heat is dissipated in the aerosol generated by the aerosol-forming substrate 204 and to simulate a worst case scenario an empty paper tube 300 was used so that all heat was dissipated to the device 100.

The aerosol-generating device 100 and aerosol-generating article 200 had the dimensions shown in Table 1.

TABLE 1

| | |
|---|---|
| Housing internal diameter | 12.1 mm |
| External diameter of heater | 8.6 mm |

TABLE 1-continued

| | |
|---|---|
| External diameter of aerosol-generating article | 7.0 mm |
| Available space between heater and internal surface of housing | 1.75 mm |
| Axial distance between distal end of aerosol-generating article and control circuitry | 5.0 mm |

The following test method was used:

Heat the heater as quickly as possible to 210 degrees centigrade without exceeding a power limit of 12 Watts.

Control the temperature of the heater to maintain it at 210 degrees centigrade for 6 minutes.

Record the power and temperature at 6 minutes.

Test Example 1

Test Example 1 had the structure of the first arrangement 108*a* of the plurality of layers of thermal insulation shown in FIG. 3A. The plurality of layers of thermal insulation 108*a* circumferentially surrounded the heater 106 and the cavity 110 containing the paper tube 300. At a distal end of the cavity 110 in the gap between the paper tube and control circuitry 105, a single layer of polyimide aerogel identical to the first thermal insulation layer 120 in FIG. 3A was arranged.

As a control, a further test example was prepared having a single layer of thermal insulation equivalent to the first thermal insulation layer 120 in FIG. 3A, that is, a sleeve made from Airloy X116 polyimide aerogel manufactured by Aerogel Technologies of Boston, MA, USA and having a thickness of 2.5 mm.

As can be seen in FIG. 4A, thermocouples were attached at the following points:

Point X1, on the outside of the paper tube at the point where it is located inside the heater 106.

Point X2, on the outside of the housing 102 at the point overlying the mid-point of the heater 106.

Point X3, on the outside of the housing 102 at a point to the left (towards a proximal end of the device) of point X2.

Point X4, on the outside of the housing 102 at a point to the right (towards a distal end of the device) of point X2.

Point X5, at the point where the electrical leads from the heater 106 are connected to the control circuitry 105.

Measurements X3 and X4 were made to assess the performance of the pyrolytic graphite sheet heat spreader and its ability to spread heat to reduce hotspots.

The results of the test on Test Example 1 are shown in Table 2 below.

TABLE 2

| Measurement | Units | Control | Test Example 1 |
|---|---|---|---|
| Power @ 210° C., 6 mins. | W | 1.56 | 1.33 |
| Temp. X1 (paper tube) | ° C. | 210.8 | 210.0 |
| Temp. X3 (housing left) | ° C. | 88.4 | 47.9 |
| Temp. X2 (housing middle) | ° C. | 89.1 | 47.4 |
| Temp. X4 (housing right) | ° C. | 77.3 | 46.9 |
| Temp. X5 (control circuitry) | ° C. | 49.8 | 44.0 |
| Ambient temperature | ° C. | 23.0 | 23.0 |

The results show that the multi-layer insulation of Test Example 1 has improved thermal insulation performance compared to the single layer insulation of the control. As can be seen from temperature measurements X2, X3 and X4 the temperature on the outside of the housing is considerably lower for Test Example 1 than it is for the control. Each of these temperatures for Test Example 1 is below 50 degrees centigrade, the comfortable threshold temperature. There is also less deviation between temperature measurements X2, X3 and X4 for Test Example 1 compared to the control showing that the heat spreader layer is effective at spreading out the heat over its area to reduce the formation of hotspots.

Furthermore, the power required to hold the heater at 210 degrees centigrade in Test Example 1 is lower compared to the control showing that multi-layer helps to improve the efficiency of the system. In addition, the temperature X5 in Test Example 1 is lower showing that the arrangement helps to protect the control circuitry from heat generated by the heater 106.

Test Example 2

Test Example 2 had the structure of the first arrangement 108*b* of the plurality of layers of thermal insulation shown in FIG. 3B. The plurality of layers of thermal insulation 108*b* circumferentially surrounded the heater 106 and the cavity 110 containing the paper tube 300. As discussed above with respect to FIG. 3B, the polymer-based housing 102 of the aerosol-generating device of FIG. 2 is replaced with an aluminium housing to provide a heat spreader layer.

As a control, a further test example was prepared having a single layer of thermal insulation equivalent to the second thermal insulation layer 134 in FIG. 3B, that is, a sleeve made from Intek™ PFI-1120 polyimide foam supplied by Trelleborg of Trelleborg, Sweden and having a thickness of 2.5 mm. The control was used with the standard polymer-based housing 102 of the aerosol-generating device of FIG. 2.

As can be seen in FIG. 4B, thermocouples were attached at the following points:

Point Y1, on the outside of the paper tube at the point where it is located inside the heater 106.

Point Y2, on the outside of the housing 102 at the point overlying the mid-point of the heater 106.

Point Y3, at the point where the electrical leads from the heater 106 are connected to the control circuitry 105.

The results of the test on Test Example 2 are shown in Table 3 below.

TABLE 3

| Measurement | Units | Control | Test Example 2 |
|---|---|---|---|
| Power @ 210° C., 6 mins. | W | 1.45 | 1.80 |
| Temp. Y1 (paper tube) | ° C. | 211 | 210 |
| Temp. Y2 (housing) | ° C. | 89 | 39 |
| Temp. Y3 (control circuitry) | ° C. | 48 | 53 |
| Ambient temperature | ° C. | 23 | 25 |

The results show that the multi-layer insulation of Test Example 2 has improved thermal insulation performance compared to the single layer insulation of the control. As can be seen from temperature measurement Y2, the temperature on the outside of the housing is considerably lower for Test Example 2 than it is for the control. Temperature measurement Y2 for Test Example 2 is well below 50 degrees centigrade, the comfortable threshold temperature. Temperature measurement Y2 also shows that the use of a housing material with high thermal conductivity (that is, greater than 200 W/m·K) can provide effective heat spreading.

Test Example 3

A third test example was also prepared. Test Example 3 had the same structure for the plurality of layers of thermal insulation as Test Example 1, that is, the first arrangement 108*a* of the plurality of layers of thermal insulation of FIG. 3A. However, in Test Example 3, the polymer-based housing 102 of the aerosol-generating device of FIG. 2 is replaced with a copper tubular housing having a diameter of 15 mm to provide an additional heat spreader layer to the pyrolytic graphite sheet heat spreader layer 122 of FIG. 3A. The thermocouple arrangement of FIG. 4B was used to measure temperature.

The results of the test on Test Example 3 are shown in Table 4 below.

TABLE 4

| Measurement | Units | Test Example 3 |
|---|---|---|
| Power @ 210° C., 6 mins. | W | 1.40 |
| Temp. Y1 (paper tube) | ° C. | 210 |
| Temp. Y2 (housing) | ° C. | 40 |
| Temp. Y3 (control circuitry) | ° C. | 47 |
| Ambient temperature | ° C. | 23 |

As can be seen from Table 4, the temperature on the outside of the housing (temperature measurement Y2) in Test Example 3 is 7 degrees centigrade lower than the equivalent temperature (temperature measurement X2) in Test Example 1. This therefore shows that the use of a housing material with high thermal conductivity (that is, greater than 200 W/m·K) can further improve the heat spreading performance of the aerosol-generating device.

The invention claimed is:

1. An aerosol-generating device, comprising:

an outer housing;

a heater configured to heat an aerosol-forming substrate;

a plurality of layers of thermal insulation arranged around at least a part of the heater, wherein the plurality of layers of thermal insulation comprises:

a first thermal insulation layer, a second thermal insulation layer, a radiation reflector layer being arranged between the first and the second thermal insulation layers, a first heat spreader layer arranged between the outer housing and the second thermal insulation layer, wherein the first heat spreader layer is anisotropic and has a thermal conductivity in directions substantially parallel to the heat spreader layer of at least 700 W/m·K, and a second heat spreader layer comprising the outer housing of the aerosol-generating device, and wherein the heater is a tubular heater comprising open longitudinally opposing ends and an internal space arranged to receive at least a portion of an aerosol-generating article; and a barrier for separating one or more of the plurality of layers of thermal insulation from an airflow pathway for conveying aerosol to a user.

2. The aerosol-generating device according to claim 1, wherein the second heat spreader layer is formed from a material having a thermal conductivity of at least 200 W/m·K.

3. The aerosol-generating device according to claim 1, wherein the first heat spreader layer further comprises graphite.

4. The aerosol-generating device according to claim 1, wherein an overall thickness of the plurality of layers of thermal insulation within the aerosol-generating device is less than 2 mm.

5. The aerosol-generating device according to claim 1, further comprising a cavity configured to receive an aerosol-generating article.

6. The aerosol-generating device according to claim 5, wherein the cavity comprises the heater.

7. The aerosol-generating device according to claim 5, wherein the plurality of layers of thermal insulation are further arranged across a distal end of the cavity.

8. The aerosol-generating device according to claim 5, wherein the plurality of layers of thermal insulation surround substantially a whole of the cavity.

9. The aerosol-generating device according to claim 1, further comprising a power source and control circuitry configured to control a supply of power to the heater, wherein at least a portion of the plurality of layers of thermal insulation is arranged between the heater and the control circuitry.

10. The aerosol-generating device according to claim 1, wherein the tubular heater further comprises a tubular substrate having a heating element disposed on or within the tubular substrate.

11. The aerosol-generating device according to claim 10, wherein the heating element is disposed on an external surface of the tubular substrate.

12. An aerosol-generating system, comprising:

an aerosol-generating device according to claim 1; and an aerosol-generating article comprising an aerosol-forming substrate.

13. The aerosol-generating device according to claim 1, wherein the thermal conductivity of the first heat spreader layer in directions substantially parallel to the heat spreader layer is between 700 W/m·K and 2000 W/m·K.

14. The aerosol-generating device according to claim 2, wherein the second heat spreader layer is formed from a material having a thermal conductivity of at least 300 W/m·K.

* * * * *